US 6,557,485 B1

(12) United States Patent
Sauter

(10) Patent No.: US 6,557,485 B1
(45) Date of Patent: May 6, 2003

(54) DUAL INTEGRATED GAUGE SYSTEM FOR SIMULTANEOUS VISUAL DISPLAY OF AT LEAST TWO ASSOCIATED PARAMETERS

(75) Inventor: Roland Sauter, deceased, late of Villingen-Schwenningen (DE), by Margit Sauter née Schwaderer

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/509,636

(22) PCT Filed: Jul. 9, 1998

(86) PCT No.: PCT/DE98/01912
§ 371 (c)(1),
(2), (4) Date: May 4, 2001

(87) PCT Pub. No.: WO99/17949
PCT Pub. Date: Apr. 15, 1999

(30) Foreign Application Priority Data

Oct. 2, 1997 (DE) .......................................... 197 43 784

(51) Int. Cl.⁷ ................................................ G09F 9/00
(52) U.S. Cl. ........................................ 116/284; 116/301
(58) Field of Search .................................. 116/284, 285, 116/286, 293, 296, 297, 300, 301, 303–4, 305, DIG. 6, DIG. 21, DIG. 36; 338/128, 132, 134

(56) References Cited

U.S. PATENT DOCUMENTS

| | | | | |
|---|---|---|---|---|
| 410,967 A | * | 9/1889 | Giroud | 116/301 |
| 1,456,313 A | * | 5/1923 | Johanson | 368/8 |
| 2,717,573 A | * | 9/1955 | Murray | 116/301 |
| 2,882,855 A | * | 4/1959 | Anderson | 116/301 |

* cited by examiner

Primary Examiner—Diego Gutierrez
Assistant Examiner—Tania C. Courson

(57) ABSTRACT

The invention relates to a measuring system, especially for display devices in the automobile technology, with at least one first and one second separately actuated control, as well as a first and second driven shaft (17, 19) which can be rotationally fixed to a display element. The second driven shaft (19) of the second control is co-axially driven by the driven shaft (17) which is designed as a hollow shaft in the first control and the second driven shaft (19) protrudes above the end of the first driven shaft (17).

20 Claims, 3 Drawing Sheets

DUAL INTEGRATED GAUGE SYSTEM FOR SIMULTANEOUS VISUAL DISPLAY OF AT LEAST TWO ASSOCIATED PARAMETERS

The present application is the national stage of PCT Application No. PCT/DE98/01912, filed on Jul. 9, 1998, which claims priority to German Application No. 19743784.2, filed Oct. 2, 1997.

BACKGROUND OF THE INVENTION

The subject invention is directed to the art of measuring systems and, more particularly, to display devices such as gauges or the like for visual presentation of associated parameters.

Measuring systems including gauges of the type under consideration are commonly used in the automotive arts to display associated parameters derived from a motor vehicle such as, for example, vehicle speed, engine rotational speed in revolutions per minute, fuel gauge indicia, and other parameters. Typical analog display instruments include a movable indicator needle that is operated by means of an underlying control mechanism such as, for example, a stepping motor or a rotor coil. The indicator needle typically extends adjacent a graduated scale providing indicia of the value range of the parameters of interest. The rotor coil or stepping motor in the underlying measuring system control actuates motion of the movable indicator needle relative to the graduated scale for a representation of the subject parameter.

In many known display systems, separate measuring systems are typically used for the display of each individual parameter. Each separate measuring system includes a set of connection contacts for supplying the respective signals to the measuring system from the corresponding parameters. Also, each measuring system typically includes a separate driven shaft provided in a housing or the like of the measuring system. The driven shaft is typically connected with an indicator needle which is moved relative to a graduated scale in a manner described above.

One problem arises, however, with respect to combination instruments of the type described above. Frequently, the desire to place the required number of measuring systems within the housing of a single combined gauge or instrument presents a space constraint problem. Often, it is desired to arrange the analog displays in close proximity to each other. However, the measuring systems that drive the analog displays often restrict the ability to do so.

One solution to the above problem consists of providing two or more measuring systems with corresponding controls in a single housing together with the use of gears or the like to effect the transfer of rotary motion between an output shaft of the measuring system and the one or more indicator needles. This solution facilitates a more remote arrangement between the respective measuring systems and the controls. Both of these solutions, however, are often costly and are therefore expensive to implement.

It is therefore desirable to provide a measuring system such as an automotive gauge system or the like that is inexpensive, occupies a small space, and has the ability of displaying the status of at least two monitored parameters simultaneously.

SUMMARY OF THE INVENTION

The subject invention provides a compact dual integrated gauge system for visual display of at least two associated parameters simultaneously. The gauge system includes first and second intermateable independently operable control devices. The first control device includes a first housing and a first hollow driven shaft extending from the first housing. The second control device includes a second housing and a second driven shaft extending from the second housing. The second driven shaft extends coaxially through the first hollow driven shaft thereby realizing the smallest possible overall construction dimensions of the subject measuring system.

The coaxial arrangement of the two driven shafts extending from two respectively independently actuatable controls enables analog display of at least two parameters within an extremely small area. The present invention conserves on space both with respect to the display elements or the display scales as well as with respect to the measuring system.

In accordance with one aspect of the invention, the measuring system includes at least two separate housings, each of which including a control and a driven shaft. At least one of the driven shafts includes a hollow opening so that the two separate housings can be assembled into a single measuring system in a stacked relationship with the hollow driven shaft of a first individual measuring system being penetrated by the driven shaft of the other individual measuring system. The inner driven shaft is coaxially received in the outer driven shaft with the free end of the inner shaft extending beyond the free end of the outer shaft for ready attachment to a display needle or the like.

In accordance with another aspect of the invention, the two measuring system are substantially identically formed except for the driven shafts and the related components or areas influenced by the shafts. This arrangement is conducive to high volume industrial production resulting in significant cost savings.

In accordance with yet another aspect of the invention, a guide sleeve is disposed on the housing of the second individual measuring system. The guide sleeve supports the second driven shaft of the second individual measuring system. Further, the guide sleeve protects the second driven shaft from movement or the like that may occur in the first hollow driven shaft or the first measuring system.

Similarly, in accordance with another aspect of the invention, a positioning collar is provided at the housing of the first individual measuring system. The positioning collar surrounds and supports the first hollow driven shaft. In addition, the positioning collar provides an installation aid for guiding the first and second driven shafts into a hole or the like of an associated installation component such as a support member or a conductor plate for mounting the assembled subject measuring system in an installed position.

In accordance with yet a further aspect of the invention, the first and second individual measuring systems include electrical connection contacts extending from the first and second housings thereof, respectively. The first individual measuring system includes a first set of electrical contacts extending from the first housing. Similarly, the second individual measuring system includes a second set of electrical connection contacts extending from the second housing. The second set of electrical contacts have a height sufficient to extend in a first direction beyond the first housing and substantially adjacent to the first set of electrical connection contacts when the first and second individual measuring systems are arranged in the preferred stacked relationship to form the assembled subject measuring system. The size and orientation of the sets of electrical connection contacts in this fashion enables electrical connection to the overall measuring system from one side thereof.

In accordance with yet another aspect of the invention, a locking means is provided to enable the selective stacked joining of the first and second individual measuring systems to form the subject dual integrated gauge system.

In addition to the above, the individual measuring systems of the present invention can be connected by means of screws, application of pressure, or the like. In addition, the present invention contemplates initially joining the two individual measuring systems by simply inserting the two driven shafts into each other and then connecting the combination of the two individual measuring systems via screws, holding clamps, or the like to an associated assembly component such as, for example, an associated conductor plate of a combination instrument. In this arrangement, one or more connection contacts of the individual measuring system can penetrate the housing of the other individual measuring system and thereby fix the relative position between the measuring systems.

In accordance with another aspect of the invention, a support member is further provided having separate retaining recesses adapted to receive the first and second individual measuring systems. A guide sleeve is preferably provided at the second individual measuring system for penetrating the support member and engaging the first individual measuring system through the support component. This advantageously results in the benefit that the second individual measuring system is fixed in place relative to the support member by means of the guide sleeve which concurrently serves as a support mechanism for the hollow second driven shaft.

In accordance with yet still a further alternative form of the invention, the support member is eliminated and the guide sleeve of the second individual measuring system is used to engage and support the hollow driven shaft of the first individual measuring system. In addition, the guide sleeve is selectively adapted to provide a means of retaining the individual measuring systems in their relative stacked relationship by means of an appropriate passage aperture provided in the housing of the first individual measuring system.

In a yet further aspect of the invention, the support element includes a locking area for engaging first and second locking means provided on the first and second housing members, respectively. The locking area holds the first and second measuring systems in place relative to the support element. This results in a simple installation of the subject measuring system.

In addition, the support element is further provided with connection means adapted to cooperate with corresponding connection means provided on an associated installation element for fastening and retaining the subject measuring system thereto. These connection means can be formed as locking members, screw connections, crimping connections including assembly pins penetrating the assembly element with pin ends twisted under pressure, or the like.

Still other aspects, advantages, and benefits the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
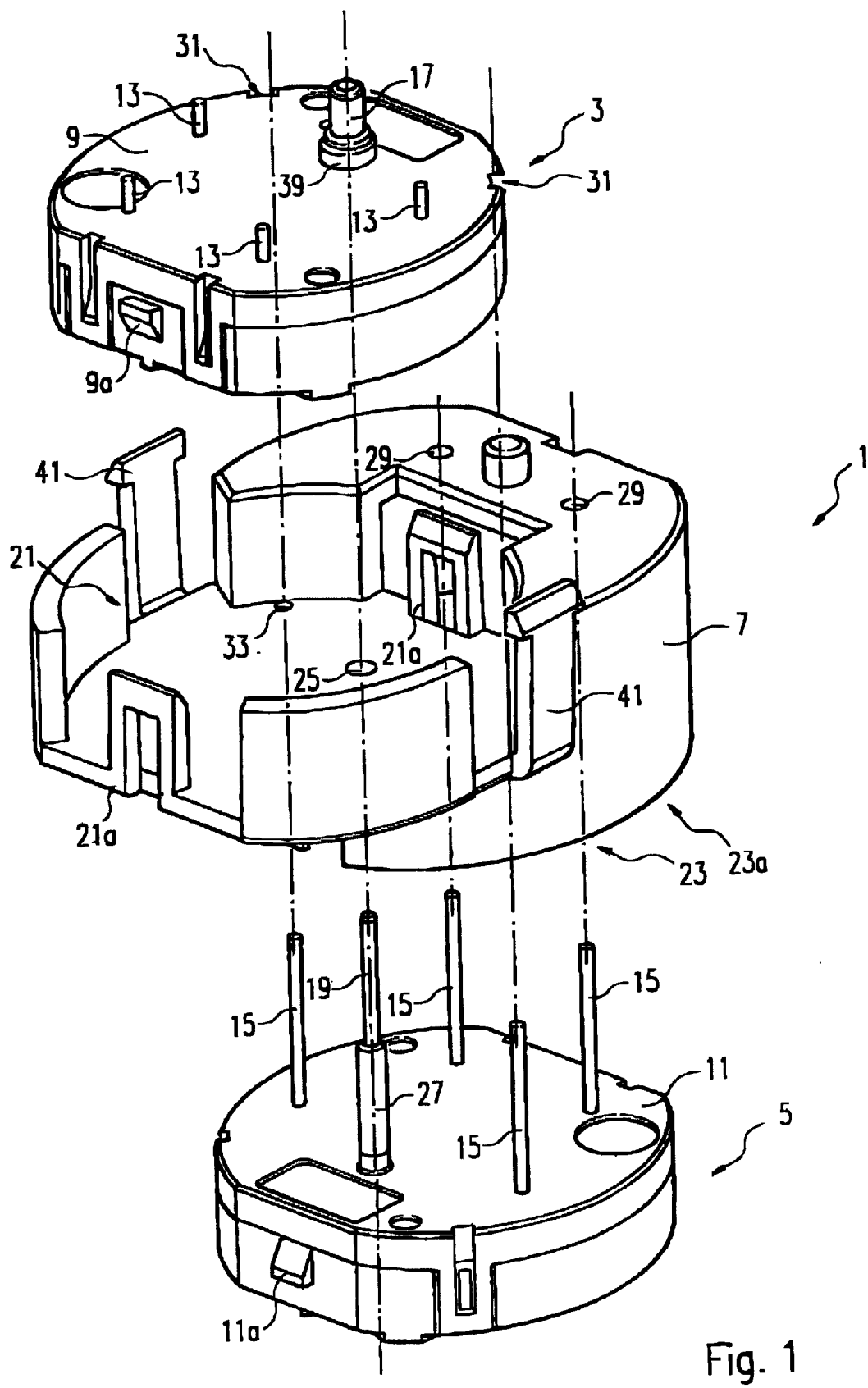
FIG. 1 is an exploded perspective view of an integrated dual measuring system formed in accordance with the preferred embodiment of the invention.

Referring now to the drawings wherein the showings are for the purposes of illustrating the preferred embodiment of the invention only and not for purposes of limiting same, the overall arrangement of the preferred form of an integrated dual measuring system formed in accordance with the invention can best be seen with reference to FIG. 1. As shown therein, the dual gauge system 1 includes a first individual measuring system 3, a second individual measuring system 5, and a support element 7. The support element serves for fastening the first and second individual measuring systems 3, 5 in the stacked relationship substantially as shown. Each of the individual measuring systems 3, 5 respectively comprise a housing 9, 11 as well as respective control devices arranged in the housings 9,11. Preferably, the control devices include stepping motors, or the like, or any other devices known in the art for providing control to components in a gauge system.

It is a primary advantage of the present invention that the first measuring system 3 includes a first hollow driven shaft 17 adapted to receive a second driven shaft 19 extending from the second measuring system 5. In that regard, the second driven shaft 19 is preferably coaxially received within the first driven shaft 17. It is to be noted that except for the above-described form of the driven output shafts and several other items related thereto to be described in detail below, each of the individual measuring systems are formed in accordance with well known techniques. More particularly, it is to be appreciated that, according to the invention, known individual measuring systems can be modified to provide a hollow driven output shaft so that the driven output shafts of known individual measuring systems can be coaxially arranged in accordance with the teachings of the present invention.

With continued reference to FIG. 1, each housing 9,11 of the first and second individual measuring systems 3, 5 are provided with pin-shaped connection contacts 13, 15. The connection contacts provide means of applying appropriate electrical control signals, or the like to actuate the individual measuring systems independently. In addition, as further shown, each of the housings 9, 11 of the individual measuring systems 3, 5 include driven output shafts 17, 19 extending in a manner as shown. Each of the driven shafts 17, 19 is selectively connectable with a separate display element such as, for example, an indicator needle.

In the preferred embodiment shown in FIG. 1, the driven shaft 17 of the first individual measuring system 3 includes a hollow opening. The driven shaft 19 of the second individual measuring system 5 is preferably formed as a solid shaft. The opening in the driven shaft 17 enables the second shaft 19 to be received coaxially therein.

The support element 7 includes a pair of recesses 21, 23 adapted to receive the individual measuring systems 3, 5, respectively. Locking projections 9a, 11a are provided on the first and second housings 9, 11 of the individual measuring systems for fastening and retaining each of the individual measuring systems 3, 5 to the support element 7. Preferably, the locking projections are formed as spring shackles and are adapted to engage counter locking projections 21a, 23a formed in areas of the assembly recesses 21, 23 of the support element.

In addition to the above, as shown, the support element 7 includes a passage bore 25 adapted to receive the second driven shaft 19 and a guide sleeve 27 provided on the second housing 11 of the second individual measuring system 5. A first portion of the guide sleeve 27 guides and stabilizes the second driven shaft 19. A second portion of the guide sleeve fixes the second individual measuring system 5 in the assembly recess 23 of the support element 7.

It is an advantage of the present invention that in order to assemble the individual components of the measuring system 1 into an integrated measuring system, it is only necessary to install the two individual measuring systems 3, 5 into the assembly recesses 21, 23 of the support element 7 and then lock the individual measuring systems in place therein. Final assembly of the system is thus simplified.

In the preferred embodiment of the invention shown in FIG. 1, the second set of connection contacts 15 of the second individual measuring system 5 extend from the interior side of the second housing 11 relative to the support element 7. The length of the second set of connection contacts 15 is selected in such a fashion that, following assembly of the first and second measuring systems into the support element in a stacked relationship, the second set of connection contacts 15 extend into an area substantially adjacent to the first set of connection contacts 13 of the first individual measuring system 3. In that regard, the first set of connection contacts 13 extend from the exterior side of the first housing 9 relative to the support element 7.

Preferably, as further shown in FIG. 1, the assembly recesses 21, 23 formed by the support element 7 are mutually offset in a radial direction relative to the coaxial driven shafts on the top side and under side of the support element body. The individual measuring systems 3, 5 are selectively installed into the assembly recesses 21, 23 of the support element 7 at a 180 degree relative angle of rotation. This provides a further advantage of the present invention whereby it becomes unnecessary to penetrate the first individual measuring system 3 with the second set of connection contacts 15 extending from the second individual measuring system 5.

In order to accommodate the elongate second pin-shaped connection contacts 15 of the second measuring system 5, a set of penetration apertures 29 are provide toward the rear portion of the support element 7. In addition, a set of recesses 31 are formed in the outer housing wall of the first individual measuring system 3. Lastly, in order to accommodate the second pair of connection contacts 15, the bottom wall of the assembly recess 21 of the support element 7 includes a set of appropriately located passage apertures 33.

Figure 2:
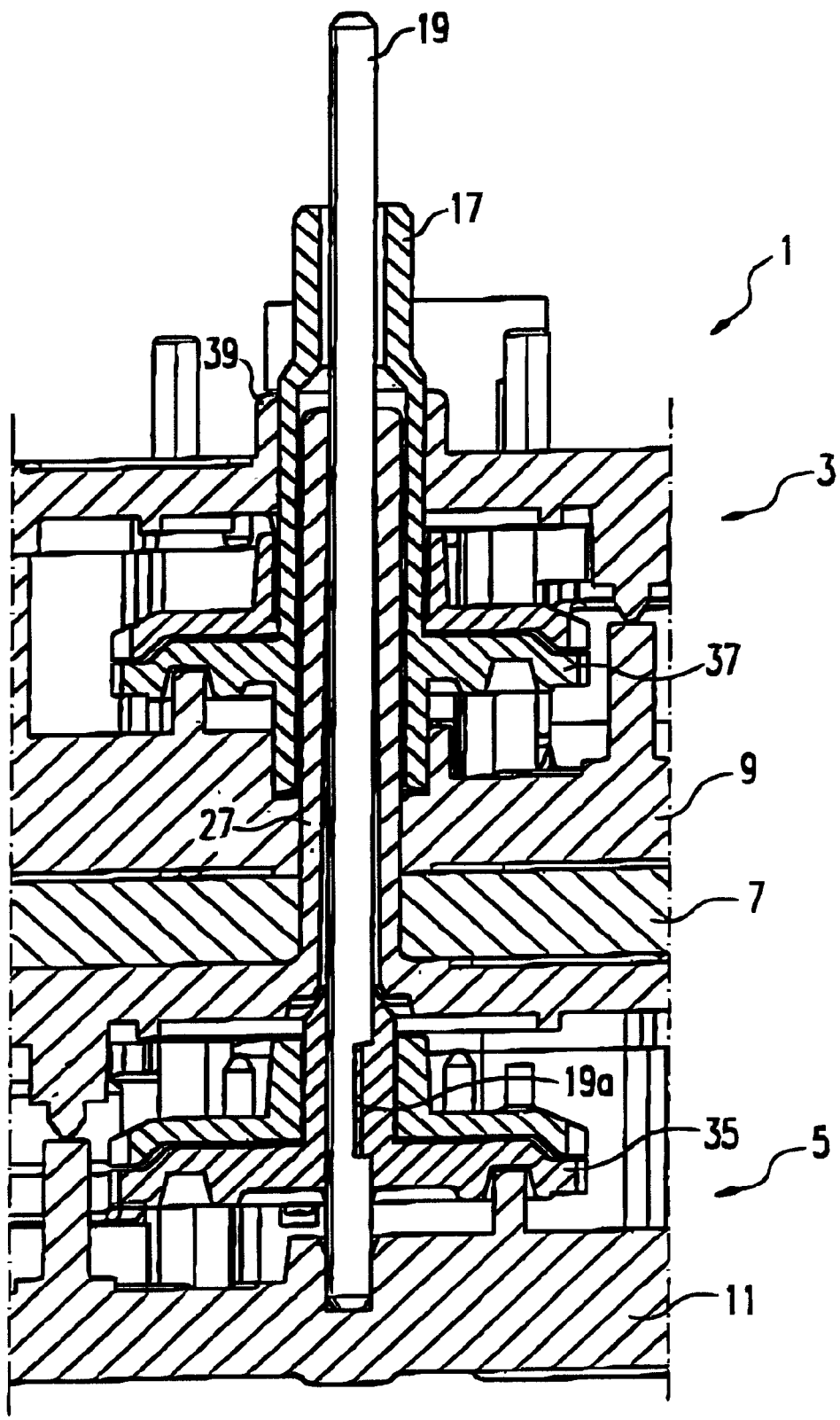
FIG. 2 is a partial cross-sectional view of the measuring system shown in FIG. 1 on a plane through the coaxial driven shafts; and, FIG. 3 is a schematic representation of a combination instrument system for use in motor vehicle applications using several measuring systems of the type formed in accordance with the present invention and shown in FIG. 1.

Turning now to FIG. 2, a portion of a cross section taken through the dual integrated gauge system 1 of FIG. 1 is shown. As illustrated, the driven shaft 19 of the second measuring system 5 is propelled by means of a pinion 35 which is adapted for coupling to an associated drive means such as, for example, a stepping motor or the like (not shown). Preferably, the pinion 35 is directly injection-molded onto the driven shaft in an area of a recess 19a which is provided for torsion-proof seating of the pinion 35 onto the driven shaft 19. A guide sleeve 27 provided at the housing 11 of the second individual measuring system 5 penetrates the passage bore or passage aperture 25 in the support element 7 and protrudes up to the hollow shaft 17 of the first individual measuring system 3. The hollow shaft 13 is formed having an appropriate diameter. In addition, preferably, the hollow shaft 17 is formed with a pinion 37 injection-molded onto the hollow shaft 17. The pinion 37 is propelled as a component of an associated gearing means such as a stepping motor or the like (not shown) of the first individual measuring system 3. The engagement between the guide sleeve 27 and the hollow shaft 17 protects the second driven shaft 19 from movement of the first hollow shaft 17. More particularly, rotational movement of the hollow shaft 17 is prevented from being transferred in a detrimental fashion onto the second shaft 19.

As shown in FIGS. 1 and 2, a fastening collar 39 surrounds the first driven shaft 17. The fastening collar 39 preferably is formed on the outside of the first housing 9 of the first individual measuring system 3. As shown best in FIG. 2, a first portion of the fastening collar 9 guides the hollow shaft 17. A second portion of the fastening collar is advantageously used to selectively connect the subject measuring system to an associated support member or plate of a combination instrument, or the like (not shown).

As illustrated, the upper free end of the hollow shaft 17 extends beyond the upper end of the fastening sleeve 27. The upper end of the hollow shaft 17 has reduced diameter and extends substantially as shown relative to the second shaft 19 without contacting the second shaft. The upper end of the hollow shaft 17 is adapted to receive an associated display element such as, for example, an indicator needle, or the like. Similarly, a second associated display element is preferably fastened onto the free end of the solid shaft 19 extending beyond the free end of the hollow shaft 17. In this manner, a simply constructed dual integrated gauge system is formed.

It is to be appreciated that the subject measuring system with dual associated display elements can be formed by use of slightly modified conventional individual measuring systems utilizing a support element and coaxially arranged first and second driven output shafts. Assembly of the components comprising the present invention merely requires two operating steps and can be easily automated. In that regard, preferably, the support element includes locking tongues 41 for selectively connecting the entire measuring system 1 onto an associated support element. In addition, the subject measuring system 1 can also be connected with an associated assembly element by means of screw connections, or other connections.

Figure 3:
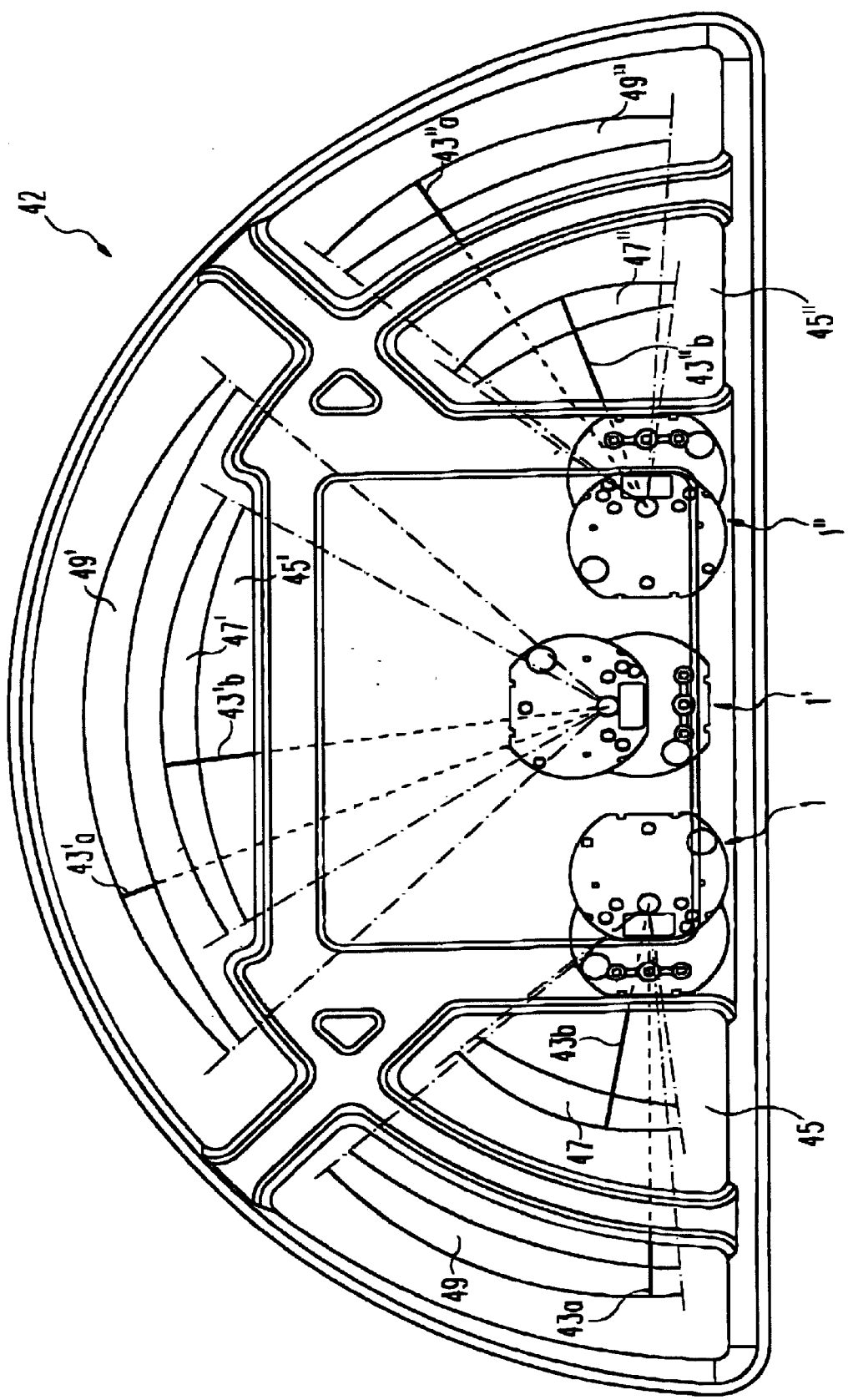

With reference next to FIG. 3, a schematic representation of a combination instrument for use in a motor vehicle is shown. FIG. 3 depicts three (3) dual integrated gauge systems 1, 1', and 1" as shown in FIGS. 1 and 2 integrated into a composite gauge system 42. Each of the dual measuring systems 1, 1', and 1" is respectively connected with two indicator needles 43a, 43b, 43'a, 43'b, or 43"a, 43"b. The longer of the two indicator needles is preferably passed under a diaphragm 45, 45', 45" on which is respectively provided a scale 47, 47', 47" for the parameter to be represented by the respective shorter indicator needle 43b, 43'b, 43"b.

In a similar fashion, diaphragms with corresponding scales 49, 49', 49" for representation of the respective parameters are further provided underneath the longer indicator needles 43a, 43'a, 43"a.

Utilization of the dual measuring system 1, 1', 1'' formed in accordance with the present invention results in an extremely simple and space saving construction in a combination instrument system 42.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A measuring system for use in associated automotive display devices, the measuring system comprising:
   at least one first and one second separately actuated control devices, each control device having, respectively, a first and second driven shaft extending from the first and second control devices, respectively, the first and second driven shafts being adapted for torsion-proof connection with a respective first and second display element, the first driven shaft of the first control device having a hollow opening and the second driven shaft of the second control device being passed co-axially through the hollow opening of the first driven shaft, the free end of the second shaft extending beyond the free end of the first driven shaft.

2. The measuring system according to claim 1 wherein:
   the first control device is disposed in a first housing to form a first individual measuring system, the first driven shaft extending from the first housing; and,
   the second control device is disposed in a second housing to form a second individual measuring system, the second driven shaft extending from the second housing.

3. The measuring system according to claim 1 wherein the first and second individual measuring systems are substantially identically formed.

4. The measuring system according to claim 1 wherein the second individual measuring system includes a guide sleeve on the second housing for providing support to the second driven shaft.

5. The measuring system according to claim 1 wherein the first individual measuring system includes a fastening collar on the first housing surrounding the first driven shaft, the fastening collar adapting the measuring system for connection to an associated support member.

6. The measuring system according to claim 1 wherein:
   the first individual measuring system includes a first set of electrical connection contacts extending in a first direction from said first housing;
   the second individual measuring system includes a second set of electrical connection contacts extending in said first direction from said second housing; and,
   the first and second individual measuring system are arranged in a stacked relationship, the second set of electrical connection contacts having a length sufficient to extend in said first direction beyond said first housing substantially adjacent to said first set of electrical connection contacts.

7. The measuring system according to claim 6 wherein each of the first and second individual measuring systems include connection members for connecting the first and second individual measuring systems in said stacked relationship.

8. The measuring system according to claim 7 wherein said connection members are locking projections.

9. The measuring system according to claim 8 wherein one of the second set of electrical connection contacts penetrate said first housing of said first individual measuring system.

10. The measuring system according to claim 6 wherein the second individual measuring system includes a guide sleeve disposed on the second housing and surrounding a portion of the second driven shaft for providing support to the second driven shaft, the guide sleeve engaging said first housing and extending coaxially into said hollow opening of the first driven shaft.

11. The measuring system according to claim 6 wherein said second set of electrical connection contacts have a length sufficient to extend in said first direction through said support element and beyond said first housing and to terminate substantially adjacent to said first set of electrical connection contacts.

12. The measuring system according to claim 11 wherein:
   the first housing of the first individual measuring system includes a first locking projection;
   the second housing of the second individual measuring system includes a second locking projection; and,
   the support element includes a first support element locking projection and a second support element locking projection adapted to lockingly engage said first and second locking projections, respectively.

13. The measuring system according to claim 12 wherein said support element includes a first connection means adapting the measuring system for connection to said associated support member.

14. The measuring system according to claim 2 further including a support element holding the first and second individual measuring systems in a relative stacked relationship, the support element defining a first assembly recess and a second assembly recess adapted to respectively receive the first and second measuring systems in said relative stacked relationship.

15. The measuring system according to claim 14 wherein the second individual measuring system includes a guide sleeve disposed on the second housing and surrounding a portion of the second driven shaft for providing support to the second driven shaft, the guide sleeve engaging said first housing and extending through said support element and coaxially into said hollow opening of the first driven shaft.

16. A dual integrated gauge system for visual display of at least two associated parameters simultaneously, the dual integrated gauge system comprising separate and independently actuated intermateable first and second control devices, the first control device including a first housing and a first hollow driven shaft extending from the first housing, the second control device including a second housing and a second driven shaft extending from the second housing coaxially through the first hollow driven shaft.

17. The dual integrated gauge system according to claim 16 wherein the first and second control devices are substantially identically formed.

18. The dual integrated gauge system according to claim 16 wherein:
   the first hollow driven shaft is adapted to carry a first associated indicator for visual display of a position of the first hollow driven shaft relative to an associated first scale; and,
   the second driven shaft is adapted to carry a second associated indicator for visual display of a position of the second driven shaft relative to an associated second scale.

19. The dual integrated gauge system according to claim 16 wherein:
   the first control device includes a first set of connection contacts extending from the first housing for selective electrical connection to the first control device; and, the second control device includes a second set of electrical connection contacts extending from the second housing and passing through the first housing for selective electrical connection to the second control device.

20. The dual integrated gauge system according to claim 16 further including a support element for holding the first and second control devices in a relative stacked relationship, the support element defining a first assembly recess and a second assembly recess adapted to respectively hold the first and second control devices in said relative stacked relationship.

* * * * *